United States Patent [19]

Leini

[11] Patent Number: 4,979,305

[45] Date of Patent: Dec. 25, 1990

[54] SAW BLADE FOR POWER OPERATED SAW

[75] Inventor: Arvo Leini, Edsbyn, Sweden

[73] Assignee: Sandvik AB, Sandviken, Sweden

[21] Appl. No.: 104,954

[22] Filed: Oct. 6, 1987

[30] Foreign Application Priority Data

Oct. 6, 1986 [SE] Sweden ............................... 8604232

[51] Int. Cl.⁵ ............................................ B23D 49/10
[52] U.S. Cl. ....................................... 30/369; 30/392; 83/746; 83/835
[58] Field of Search .................. 30/369, 392, 393, 394; 83/746, 748, 751, 835, 849

[56] References Cited

U.S. PATENT DOCUMENTS

| 1,491,134 | 4/1924 | De Northall . | |
|---|---|---|---|
| 1,537,980 | 5/1925 | Asselin | 30/392 |
| 1,838,125 | 12/1931 | Wirtz | 30/394 |
| 2,534,001 | 12/1950 | Couse | 83/751 X |
| 2,840,125 | 6/1958 | Kirksey | 30/369 |
| 3,064,698 | 11/1962 | La Force | 83/746 |
| 3,716,916 | 2/1973 | Alexander | 30/369 |

FOREIGN PATENT DOCUMENTS

| 3329824 | 8/1984 | Fed. Rep. of Germany . | |
|---|---|---|---|
| 560035 | 9/1923 | France . | |
| 155637 | 8/1956 | Sweden . | |
| 2134038 | 8/1984 | United Kingdom . | |
| 2158970 | 11/1985 | United Kingdom | 30/392 |

Primary Examiner—Frank T. Yost
Assistant Examiner—Rinaldi Rada
Attorney, Agent, or Firm—Burns, Doane, Swecker & Mathis

[57] ABSTRACT

A sawing apparatus includes a guide and a pair of oppositely reciprocable saw blades mounted in a groove of the guide. Mounting portions of the saw blades disposed within the groove slidingly engage one another within an interface plane. Each saw blade includes a cutting portion disposed outside of the groove and carrying outwardly set teeth and inwardly set teeth. The inwardly set teeth extend toward and beyond the interface plane. Feed forces can be applied from the guide to the saw blades by inclined end edges of plates which form the guide. The end edges are inclined obliquely so as to face away from the interface plane and engage correspondingly inclined surfaces of the saw blades. Alternatively, feed forces can be applied to back shoulders of the mounting portions of the saw blades by a member which extends between the guide plates within the groove.

7 Claims, 1 Drawing Sheet

SAW BLADE FOR POWER OPERATED SAW

FIELD OF INVENTION

The present invention relates to power operated saws with reciprocating blades for cutting of wood, particularly for hand-held portable saws.

BACKGROUND OF THE INVENTION

Hand-held power operated saws of many types are already known, using saw means shaped as saw chains, circular blades, bandsaw blades or reciprocating blades.

Long reciprocating blades have been tried repeatedly, and then commonly as a narrow blade sliding in a groove in a sturdier blade guide. This design makes it necessary to make the narrow blade so thick or set its teeth so wide that the blade guide can enter the kerf. This produces an undesirable amount of sawdust, and the resultant cutting force may become so large that it is difficult to hold the saw steady.

In order to lower the resultant force it has been suggested (FR No. 560.035, GB No. 2.134.038, DE No. 3329824, SE No. 155.637) that two or more blades could be used with motion in opposite direction to balance inertial forces as well as sawing forces.

None of these has been a commercial success, since they do not clear the whole kerf bottom. Saw dust particles and wood fibres tend to become wedged in between the blades, prying them apart. This is especially serious in sawing parallel to the fibres. To avoid damage from this reason, certain designs have introduced sliding rivet joints (GB No. 2.134.038, DE No. 3329824) with a risk of clogging the holes, or long dovetail grooves (SE No. 155.637) with associated lubricating problems.

The present invention concerns a design and a tooth setting principle, which ensure that the whole width of the kerf bottom is cleared from sawdust and fibres, and that the blades are held against each other by the support forces without rivets.

THE DRAWINGS

The invention is described in the following with reference to the figures depicting one preferred embodiment.

DESCRIPTION OF THE INVENTION

Figure 1:
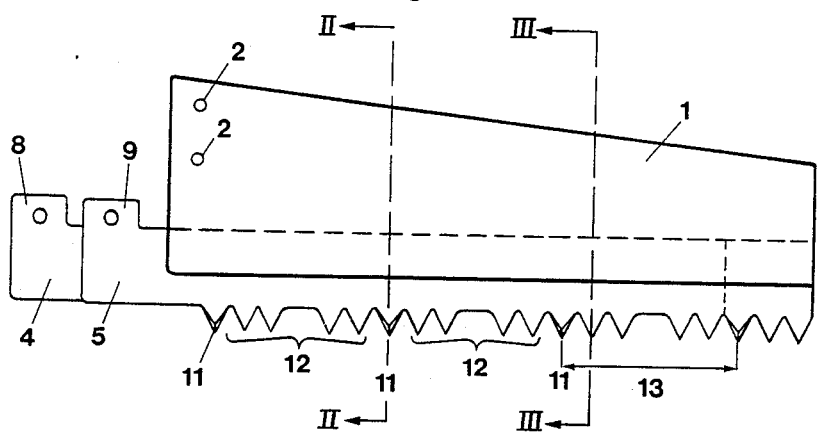
FIG. 1 shows a side view of the saw blade arrangement

A sawblade arrangement according to the invention comprises a blade guide (1) of known type, with attachment holes (2) for fastening to the motor part, not shown, a central groove (3), into which extend the backs or mounting portion 20, 21 of two sawblades (4, 5), and two internal guiding surfaces (6, 7) which constitute the sides of the groove (3) and which guide the sawblades (4, 5).

The blade guide (1) is somewhat longer than the toothed portion of each sawblade (4, 5).

In the end closest to the motor part, the sawblades (4, 5) carry connecting lugs (8, 9) which be detachably connected to reciprocating parts in a crank mechanism driven by a motor, not shown.

The saw blades include cutting portions disposed outside of the groove (3) and carrying cutting teeth. Previously known sawblade arrangements with multiple reciprocating sawblades have usually avoided interference between the teeth of adjoining sawblades by having only straight teeth without set (FR No. 560.035) or by having no teeth set inwards (SE No. 3329824) or by having the tooth lines of adjoining sawblades offset sideways or vertically so far that they can move without interference (SE No. 155.637). According to the present invention the sawblades (4, 5) have some teeth (11) set inwards so far that they cross an interface plane P defined by the sliding interface between the contact surfaces (10) of the blade mounting portions (20, 21) and have some teeth (12) set outwards away from interface plane. The amount of set crossing the interplace plane P for teeth (11) set inwards is less than the amount of set for teeth (12) set outwards, to make it possible for two such teeth (11, 12) to pass each other when the sawblades (4, 5) move in opposite directions.

Figure 4A:
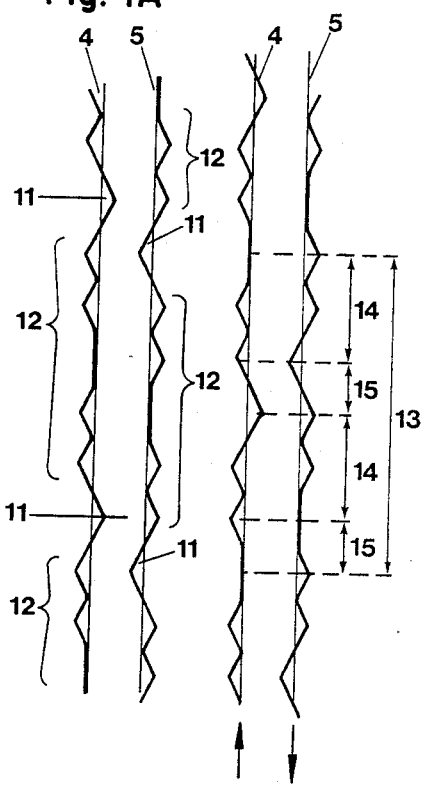
FIG. 4A is a schematic view of the saw blades of FIG. 2 as seen from below when each saw blade is at one end of its stroke.
Figure 4B:
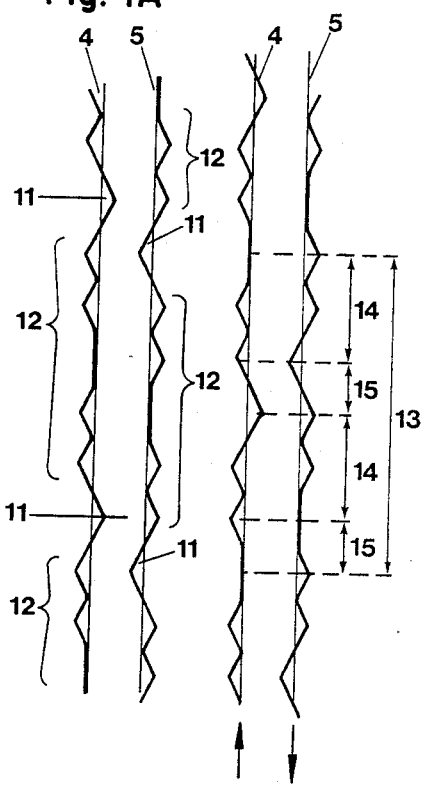
FIG. 4B is a view similar to FIG. 4A when the saw blades have moved to the other end of their stroke in the direction of the arrows.

Two teeth (11) both set inwards to croos the interface plane would not be able to pass each other, but according to the invention the reciprocating motion of the sawblades (4, 5) is possible because teeth (11) set inwards constitute only a minority of teeth, and are spaced with a distance (13) along the sawblades (4, 5) which exceeds twice the length (14) of the stroke of the reciprocating motion with an amount equal to twice the distance (15) between the point of one such tooth (11) on one blade (4) and the point of a neighbouring similar tooth (11) on the other blade (5) at the end of the stroke when the blades are about to change direction, shown in FIG. 4. This distance (15) should when the teeth (11) are symmetrical not be less than the width of the tooth (11) measured in the setting deformation zone near the root of the tooth (11).

Those teeth (12) that are set outwards away from the interface plane P are perferentially placed with varying distances to inhibit the tendency to vibrate, and their number should be greater than the number of teeth (11) set inwards to cross the interface plane. The teeth (11) set inwards are preferentially chamfered so that their cuttitng forces pull the sawblades 4A, 5A against each other. The teeth (12) set outwards can be chamfered or nonchamfered or both.

Figure 3:
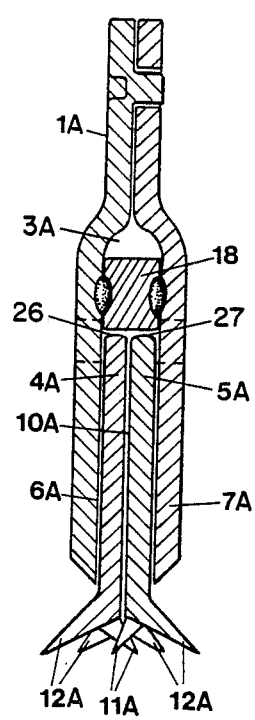
FIG. 3 shows a section along the line III—III of FIG. 1 in an alternative embodiment

The simplest form of the sawblades (4, 5) shown in FIG. 3 is as flat strips excepting the teeth 11A, 12A and connecting lugs (8, 9) and in that case the feed force is transmitted to the back rear shoulders (26, 27) of the blades (4A, 5A) from a bottom (18) of the groove (3). The bottom wall-forming member (18) can then be made from a harder or more resistant material than the rest of the blade guide (1A), or provided with rotating supporting elements.

Figure 2:
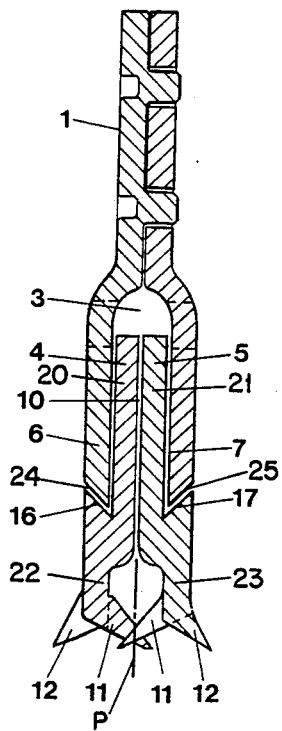
FIG. 2 shows a section along the line II—II of FIG. 1

Another preferred form of the sawblades (4, 5) shown in FIG. 2 includes carrying ledges (16, 17) on the outside, to match end edges (24, 25) of teh guides plates. The ledges (16, 17) and edges (24, 25) can be inclined obliquely to face away from the plane P for better guiding. With this arrangement, the feed force is transmitted to the sawblades (4, 5) outside of their center, which tends to press their lower parts against each other.

The ledges (16, 17) can be shaped be coining of thin sawblade material, by milling or grinding of thicker material, or by joining to layers of material, one of which forms the ledge (16, 17) and the other extends into the groove (3).

I claim:

1. A sawing apparatus comprising:
a guide forming a longitudinal groove, said guide including a pair of longitudinally extending walls spaced from one another to form said groove therebetween, each of said walls including an external surface, an internal surface, and a longitudinal edge surface, said internal surfaces facing one another to form sides of said groove,
a pair of saw blades each including a mounting portion disposed in said groove and a cutting portion disposed outside of said groove, said mounting portions including mutually facing surfaces which slidingly engage one another within an interface plane, each of said cutting portions including a series of longitudinally spaced cutting teeth;
said saw blades being mounted for longitudinal reciprocal movement in said groove such that as each saw blade undergoes a stroke in one direction the other saw blade undergoes a stroke in the opposite direction,
said series of cutting teeth of each of said saw blades including a plurality of teeth set outwardly away from said interface plane, and a plurality of cutting teeth set inwardly toward said interface plane,
each of said edge surfaces of said guide being obliquely inclined to face away from said interface plane, and
each of said saw blades including a longitudinally extending ledge surface facing respective ones of said edge surfaces and being obliquely inclined correspondingly to said edge surfaces.

2. A sawing apparatus comprising:
a guide forming a longitudinal groove,
a pair of saw blades each including a mounting portion disposed in said groove and a cutting portion disposed soutside of said groove, said mounting portions including mutually facing surfaces which slidingly engage one another within an interface plane, each of said cutting portions including a series of longitudinally spaced cutting teeth;
said saw blades being mounted for longitudinal reciprocal movement in said groove such that as each saw blade undergoes a stroke in one direction the other saw blade undergoes a stroke in the opposite direction,
said series of cutting teeth of each of said saw blades including a plurality of teeth set outwardly away from said interface plane, and a plurality of cutting teeth set inwardly and passing through and beyond said interface plane,
the number of said inwardly set cutting teeth of each of said saw blades being less than half of the number of said outwardly set cutting teeth of such saw blade, and
a longitudinal spacing between successive ones of said inwardly set cutting teeth on each of said saw blades being greater than two times a stroke length of such blade.

3. A sawing apparatus according to claim 2, wherein said mounting portions include longitudinal rear shoulders which are spaced from a back wall of said groove when said edge surfaces apply a feed force to said ledge surfaces.

4. A sawing apparatus according to claim 2, wherein the amount of set of the portions of said inwardly set cutting teeth extending beyond said reference plane is less than the amount of set of said outwardly set cutting teeth.

5. A sawing apparatus according to claim 2, wherein said guide includes a pair of longitudinally extending walls spaced from one another to form said groove therebetween, each of said walls including an external surface, an internal surface, and a longitudinal edge surface, said internal surfaces facing one another to form sides of said groove, each of said edge surfaces being obliquely inclined to face away from said interface plane, each of said saw blades including a longitudinally extending ledge surfsace facing respective ones of said edge surfaces and being obliquely inclined correspondingly to said edge surfaces.

6. A support plate for a saw having two saw blades arranged adjacent and parallel to each other and reciprocating in opposite directions, which saw blades are provided with longitudinal rear shoulders at their outer surfaces and facing away from teeth of the saw blades, said support plate comprising:
two individual plates extending in a longitudinal direction parallel to each other, each plate having an upper edge, a lower edge, an internal surface and an external surface, and said plates being disposed with their internal surfaces facing each other;
each plate being bent outwardly and downwardly to form a longitudinal step extending in said longitudinal direction;
each step being disposed between the upper and lower edges of the respective plate and dividing the respective plate into an upper section and a lower, blade supporting section; the upper sections of the two plates being rigidly connected together;
the lower sections of the two plates being parallel to each other and spaced apart relative to said upper sections by the steps, said steps displacing said lower sections outwardly to define a longitudinally extending cavity between said lower sections for receiving, in use, said saw blades with the longitudinal rear shoulders of the saw blades opposing a wall of said cavity defined by a member extending between said internal surfaces of said lower sections of said plates so that said wall of said cavity is positioned to apply a feed force to said shoulder of said blades.

7. The support plate of claim 6, wherein said member has a hardness which is greater than a hardness of said plates.

* * * * *